(12) United States Patent
Asher et al.

(10) Patent No.: US 10,217,325 B2
(45) Date of Patent: *Feb. 26, 2019

(54) CLEARING BETS

(71) Applicant: CFPH, LLC, New York, NY (US)

(72) Inventors: Joseph M. Asher, New York, NY (US); Howard W. Lutnick, New York, NY (US)

(73) Assignee: CFPH, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/246,586

(22) Filed: Apr. 7, 2014

(65) Prior Publication Data

US 2014/0221064 A1 Aug. 7, 2014

Related U.S. Application Data

(63) Continuation of application No. 13/470,546, filed on May 14, 2012, now Pat. No. 8,690,667, which is a continuation of application No. 12/540,432, filed on Aug. 13, 2009, now Pat. No. 8,177,635, which is a continuation of application No. 10/798,115, filed on Mar. 10, 2004, now Pat. No. 7,582,013.

(51) Int. Cl.
*A63F 9/24* (2006.01)
*G07F 17/32* (2006.01)
*G06Q 20/02* (2012.01)

(52) U.S. Cl.
CPC ....... *G07F 17/3288* (2013.01); *G06Q 20/023* (2013.01); *G07F 17/3232* (2013.01)

(58) Field of Classification Search
USPC ............. 463/9, 16–21, 24–25, 27–29, 39–43
See application file for complete search history.

(56) References Cited

U.S. PATENT DOCUMENTS

| | | | |
|---|---|---|---|
| 5,411,258 A | 5/1995 | Wilson et al. |
| 5,564,977 A | 10/1996 | Algie |
| 5,729,212 A | 3/1998 | Martin |
| 5,749,785 A | 5/1998 | Rossides |
| 5,830,068 A | 11/1998 | Brenner et al. |
| 6,004,211 A | 12/1999 | Brenner et al. |
| 6,089,981 A | 7/2000 | Brenner et al. |

(Continued)

FOREIGN PATENT DOCUMENTS

| | | |
|---|---|---|
| JP | 60-22268 | 2/1985 |
| JP | H10-40321 | 2/1998 |

(Continued)

OTHER PUBLICATIONS

European Search Report for Application No. 05725261.1-2221; 3 pages; dated Oct. 31, 2007.

(Continued)

*Primary Examiner* — Sunit Pandya (57) ABSTRACT

This disclosure provides a pari-mutuel wagering system that includes a first wagering facility communicably coupled with a network and operable to receive a bet on a wagering event hosted by a second wagering facility. The first wagering facility is further operable to transmit the bet to the second wagering facility via the network. The system further includes a clearinghouse communicably coupled with the network and operable to capture audit information associated with the bet from the network.

13 Claims, 5 Drawing Sheets

(56) References Cited

U.S. PATENT DOCUMENTS

| | | | |
|---|---|---|---|
| 6,099,409 | A | 8/2000 | Brenner et al. |
| 6,174,235 | B1 | 1/2001 | Walker et al. |
| 6,554,708 | B1 | 4/2003 | Brenner et al. |
| 6,554,709 | B1 | 4/2003 | Brenner et al. |
| 6,773,347 | B1 | 8/2004 | Marshall et al. |
| 6,837,791 | B1 | 1/2005 | McNutt et al. |
| 6,902,480 | B2 | 6/2005 | Kidron |
| 6,929,550 | B2 | 8/2005 | Hisada |
| 7,172,508 | B2 | 2/2007 | Simon et al. |
| 7,442,124 | B2 | 10/2008 | Asher et al. |
| 7,543,152 | B2 | 6/2009 | Hamalainen et al. |
| 8,177,635 | B2 | 5/2012 | Asher et al. |
| 8,690,667 | B2 | 4/2014 | Asher et al. |
| 2001/0037293 | A1 | 11/2001 | Hindman et al. |
| 2001/0039209 | A1 | 11/2001 | DeWeese et al. |
| 2001/0047291 | A1 | 11/2001 | Garahi et al. |
| 2002/0058548 | A1 | 5/2002 | Stronach |
| 2002/0065566 | A1 | 5/2002 | Aronson et al. |
| 2002/0111213 | A1 | 8/2002 | McEntee et al. |
| 2003/0144057 | A1* | 7/2003 | Brenner et al. ........... 463/40 |
| 2003/0157976 | A1 | 8/2003 | Simon et al. |
| 2003/0199315 | A1 | 10/2003 | Downes |
| 2004/0235542 | A1 | 11/2004 | Stronach et al. |
| 2005/0096109 | A1 | 5/2005 | McNutt et al. |
| 2005/0102223 | A1 | 5/2005 | Vlazny et al. |
| 2005/0107151 | A1 | 5/2005 | Amaitis et al. |
| 2005/0181868 | A1 | 8/2005 | Vlazny et al. |
| 2005/0202873 | A1 | 9/2005 | Asher et al. |
| 2005/0202874 | A1 | 9/2005 | Asher et al. |
| 2005/0227757 | A1 | 10/2005 | Simon et al. |
| 2006/0009281 | A1 | 1/2006 | Stronach |
| 2008/0102940 | A1 | 5/2008 | Asher et al. |
| 2008/0102941 | A1 | 5/2008 | Asher et al. |
| 2009/0298580 | A1 | 12/2009 | Asher et al. |
| 2012/0225704 | A1 | 9/2012 | Asher et al. |

FOREIGN PATENT DOCUMENTS

| | | |
|---|---|---|
| JP | H10-63743 | 3/1998 |
| JP | 2003-248740 | 9/2003 |
| NZ | 521779 | 10/2001 |
| NZ | 521822 | 10/2001 |
| WO | WO 1997/009699 | 3/1997 |
| WO | WO 2000/025876 | 5/2000 |
| WO | WO 2000/079442 | 12/2000 |
| WO | WO 2001/065508 | 9/2001 |
| WO | WO 2001/077962 | 10/2001 |
| WO | WO 2001/077971 | 10/2001 |
| WO | WO 2002/043825 | 6/2002 |
| WO | WO 2003/089089 | 10/2003 |
| WO | WO 2004/097549 | 11/2004 |
| WO | WO 2005/107909 | 11/2005 |

OTHER PUBLICATIONS

Patent Pending U.S. Appl. No. 10/798,106; 33 pages; filed Mar. 10, 2004.
USPTO Office Action for U.S. Appl. No. 10/798,106; 9 pages; dated Sep. 6, 2006.
USPTO Office Action for U.S. Appl. No. 10/798,106; 15 pages; filed Mar. 23, 2007.
Examination report for NZ Patent Application No. 549744; 2 pages dated May 18, 2007.
Examination report for NZ Patent Application No. 549745; 2 pages dated May 18, 2007.
PCT Notification of the Transmittal of the International Search Report and the Written Opinion of the International Searching Authority for International Application No. PCT/US05/07997; 8 pages; dated Aug. 14, 2006.
PCT Notification of Transmittal of the International Search Report and Written Opinion for International Application No. PCT/US05/07994; 8 pages; dated Oct. 19, 2006.
European Patent Office; Office Action for Application No. 05725261.1-2221; 5 pages; dated Jan. 23, 2008.
USPTO Office Action for U.S. Appl. No. 10/798,115; 13 pages; dated Mar. 4, 2008.
USPTO Office Action for U.S. Appl. No. 10/798,115; 9 pages; dated Jun. 14, 2006.
USPTO Office Action for U.S. Appl. No. 10/798,115; 14 pages; dated Dec. 15, 2006.
Patent Pending U.S. Appl. No. 10/798,115; 34 pages; filed Mar. 10, 2004.
USPTO Office Action for U.S. Appl. No. 10/798,115; 13 pages; dated Jul. 25, 2007.
USPTO Notice of Allowance for U.S. Appl. No. 10/798,106; dated Oct. 10, 2007.
USPTO Office Action for U.S. Appl. No. 10/798,106; dated Jul. 12, 2007.
New Zealand Racing Board Opposition to NZ Patent Application No. 549745; 3 pages; Sep. 1, 2008.
New Zealand Racing Board Opposition Statement of Case filed by Opponents to NZ Patent Application No. 549745; 52 pages; Sep. 29, 2008.
Patent Pending U.S. Appl. No. 11/968,390; 33 pages; filed Jan. 2, 2008.
Patent Pending U.S. Appl. No. 11/968,407; 31 pages; filed Jan. 2, 2008.
"Fact Sheet: History of Greyhound Racing in Oregon"; http://74.125.95.132/search?q=cache:HYNg_2Pq8XoJ:www.grey2kusa.org/pdf/historyOR.pdf+hub+wager+1990&hl=en&ct=clnk&cd=3&gl=us; Accessed Feb. 12, 2009; 20 pages.
Quantum Data Center; http://www.scigames.com/sections/diversified-gaming/quantum-data-center.aspx; Accessed Feb. 12, 2009; 2 pages.
McClelland, Edward; "Why doesn't anybody go to the Horse Races?"; May 1, 2008; http://www.slate.com/id/2189475; Accessed Feb. 12, 2009; 5 pages.
Unitedtote: The most advanced wagering system; http://www.unitedtote.com/Operations/DataCenters/tabid/64/Default.aspx; Accessed Feb. 12, 2009; 1 page.
U.S. PTO Office Action for U.S. Appl. No. 10/798,115; 11 pages; dated Jan. 6, 2009.
U.S. PTO Notice of Allowance for U.S. Appl. No. 10/798,115; 7 pages; dated Jun. 26, 2009.
EP Search Report for EP Application No. 09003048.7; dated Jun. 3, 2009; 29 pages.
U.S. PTO Office Action for U.S. Appl. No. 11/968,407; dated Nov. 23, 2010; 19 pages.
JP Office Action for Application No. 2007-503016 dated Feb. 22, 2011; 3 pages (with 4 pages of English Translation).
U.S. PTO Office Action for U.S. Appl. No. 12/540,432; 4 pages; dated Apr. 11, 2011.
EP Search Report for EP Application No. 05728315.2; dated Dec. 3, 2009; 6 pages.
U.S. PTO Office Action for U.S. Appl. No. 11/968,390; dated Mar. 16, 2011; 25 pages.
AU Examination Report for Application No. 2005221160 dated Nov. 18, 2009; 5 pages.
New Zealand Intellectual Property office Withdrawal of New Zealand Racing Board Opposition for NZ Patent Application No. 549745 dated Mar. 22, 2010; 15 pages.
U.S. PTO Office Action for U.S. Appl. No. 11/968,407; dated Aug. 18, 2011; 15 pages.
Notice of Acceptance for AU Application No. 2005221160; 3 pages; dated Aug. 2, 2011.
AU Notice of Acceptance for Application No. 2005221161 dated Aug. 10, 2011; 3 pages.
JP Office Action for Application No. 2007-503015 dated Dec. 7, 2010; 6 pages (with 3 pages of English Translation).
JP Office Action for Application No. 2007-503015 dated Nov. 29, 2011; 6 pages (with 3 pages of English Translation).
U.S. PTO Office Action for U.S. Appl. No. 11/968,390; dated Jan. 5, 2012; 14 pages.
Notice of Allowance for U.S. Appl. No. 12/540,432; 15 pages; dated Dec. 28, 2011.

(56) References Cited

OTHER PUBLICATIONS

U.S. PTO Office Action for U.S. Appl. No. 11/968,390; dated Nov. 8, 2012; 15 pages.
U.S. PTO Advisory Action for U.S. Appl. No. 11/968,390; dated Dec. 13, 2012; 3 pages.
U.S. PTO Advisory Action for U.S. Appl. No. 11/968,407; dated Feb. 1, 2012; 3 pages.
U.S. PTO Office Action for U.S. Appl. No. 11/968,407; dated Sep. 27, 2012; 12 pages.
"Mutuels" posted Apr. 3, 2003, http://web.archive.org/web/20030403134252/http://www.tra-online.com/manual/mutuels.pdf.
"Notice of Pari-Mutuel Operations Committee Meeting" Feb. 9, 2004.
JP Office Action for U.S. Appl. No. 2007-503015 dated Jul. 3, 2012; 6 pages (with 3 pages of English Translation).
U.S. PTO Office Action for U.S. Appl. No. 13/470,546; dated Mar. 11, 2013; 9 pages.
AU Notice of Acceptance for Application No. 2011253538 dated Dec. 7, 2012; 12 pages.
U.S. PTO Office Action for U.S. Appl. No. 11/968,407; dated Mar. 28, 2013; 15 pages.
AU Examination Report for Application No. 2011250681; dated May 31, 2013; 3 pages.
CA Office Action for Application No. 2,559,064; dated May 15, 2013; 2 pages.
EP Communication for Application No. 09003048.7; dated May 27, 2013; 4 pages.
JP Office Action for Application No. 2007-503015 dated Jun. 11, 2013; 8 pages (w/English Translation).
CA Office Action for Application No. 2,559,859; dated Apr. 15, 2013; 2 pages.
U.S. PTO Notice of Allowance for U.S. Appl. No. 13/470,546; dated Nov. 13, 2013; 11 pages.
U.S. PTO Advisory Action for U.S. Appl. No. 11/968,390; dated Nov. 15, 2013; 6 pages.
CA Office Action for Application No. 2,559,859; dated Feb. 11, 2014; 3 pages.
U.S. PTO Office Action for U.S. Appl. No. 11/968,407; dated Feb. 28, 2014; 8 pages.
CA Examiners Requisition for Application No. 2,559,859; dated Mar. 10, 2015; 3 pages.
AU Patent Examination Report No. 1 for App. No. 2015200943; dated Aug. 18, 2015; 3 pages.
AU First Examination Report for Application No. 2016213918; dated Jun. 21, 2017; 3 pages.
CA Notice of Allowance for Application No. 2,559,859; dated Mar. 31, 2016; 1 page.
CA Examiners Requisition for Application No. 2,943,959; dated Jul. 10, 2017; 6 pages.
CA Notice of Allowance for Application No. 2,943,959; dated Jun. 27, 2018; 1 page.

\* cited by examiner

FIG. 1

| TRANSACTION ID | FIRST WAGERING FACILITY | SECOND WAGERING FACILITY | TERMINAL | EVENT | BET | BET AMOUNT | TIME | BETTOR | HUB |
|---|---|---|---|---|---|---|---|---|---|
| 1 | LSP | MIA | 12A | 142 | 1 | 5.00 | 062204 1400 01.23 | 5466... | ATL |
| 2 | MED | MIA | B01 | 142 | 1,2,3 | 1000.00 | 062204 1421 01.23 | 5466... | NY |
| 3 | LSP | MED | 12B | 13X | 2 | 20.00 | 062204 1530 01.23 | 123... | ATL |
| ... | ... | ... | ... | ... | ... | ... | ... | ... | ... |

CLEARING BETS

CROSS REFERENCE TO RELATED APPLICATIONS

This application is a continuation of U.S. patent application Ser. No. 13/470,546 (now U.S. Pat. No. 8,690,667), filed May 14, 2012 by Howard W. Lutnick and Joseph M. Asher, which is a continuation of U.S. patent application Ser. No. 12/540,432 (now U.S. Pat. No. 8,177,635), filed Aug. 13, 2009 by Howard W. Lutnick and Joseph M. Asher, which is a continuation of U.S. patent application Ser. No. 10/798,115 (now U.S. Pat. No. 7,582,013), filed Mar. 10, 2004 by Howard W. Lutnick and Joseph M. Asher, each of which is hereby incorporated by reference herein in its entirety.

TECHNICAL FIELD OF THE INVENTION

This disclosure relates generally to the field of gaming and, more specifically, to a system and method for high-speed pari-mutuel wagering using a clearinghouse.

BACKGROUND OF THE INVENTION

Wagering on events such as horse races or jai alia, for example, is a large and growing industry in many parts of the world. Typical horse racing bets allow bettors to bet on a single horse or on several horses in a particular race or series of races. For instance, a bettor can bet on a particular horse to finish first (win), finish in the top two (place), or finish in the top three (show). A bettor may also make various combination bets with multiple horses, such as an exacta bet (covering the top two horses in order) or a trifecta bet (covering the top three horses in order). In addition, a bettor may bet on a series of races such as, for example, the daily double (winners of two consecutive races), the pick-three (winners of three consecutive races), and the pick-six (winners of six consecutive races).

In a pari-mutuel ("among ourselves") wagering system, all bets regarding a particular event are aggregated, a percentage (or "take-out") is taken by each facility at which the respective bet is made, and the remainder is distributed among the winning bettors. In other words, typical pari-mutuel betting systems, occasionally termed "totalisator" or "tote" systems, have bettors wagering against other bettors rather than against the house. This betting pool often includes bets made from a number of wagering facilities. Typically, bets sent from a non-host facility to the hosting facility experience delays in both transmission (such as through batch processing) and processing, which leads to delays in odds calculations from the host facility. These delays further allow for situations where bets are received, and odds calculated, after commencement of the event on which the bets are placed. Also, it is often difficult to track or audit bets. These situations create potential for fraudulent betting practices and a general unease by the betting public. Moreover, conventional pari-mutuel systems provide no systematic way for facilities to settle accounts among various wagering facilities after the event is completed.

SUMMARY OF THE INVENTION

In one embodiment, this disclosure provides a pari-mutuel wagering system that includes a first wagering facility communicably coupled with a network and operable to receive a bet on a wagering event hosted by a second wagering facility. The first wagering facility is further operable to transmit the bet to the second wagering facility via the network. The system further includes a clearinghouse communicably coupled with the network and operable to capture audit information associated with the bet from the network.

In another embodiment, the disclosure provides a wagering system associated with a first wagering facility, the system communicably coupled with a network and including a memory operable to store betting odds on a plurality of wagering events hosted by the first wagering facility. The system further includes a processor coupled to the memory and operable to receive a first bet on a particular event via the network, the particular event comprising at least one of the wagering events hosted by the first wagering facility. If a second bet is received within a predetermined period of time after the first bet is received, then the processor recalculates the betting odds on the particular event based upon both of the first bet and the second bet. If a second bet is not received within a predetermined period of time after the first bet is received, then the processor recalculates the betting odds on the particular event based upon the first bet.

In yet another embodiment, the disclosure provides a method for conducting wagering. The method includes receiving at a first wagering facility a plurality of bets on a wagering event that is hosted by a second wagering facility, wherein the first wagering facility is coupled to the second wagering facility using a network. Each of the plurality of bets are transmitted individually to the second wagering facility using the network.

The invention has several important advantages. Various embodiments of the invention may have none, some, or all of these advantages. One advantage of the present invention is that it provides a high-speed wagering network capable of processing a large number of betting transactions on an individual, real-time basis. Another advantage of the present invention is that it may provide confidence to bettors that bets will not be placed after the event's commencement. Further, the present invention may automatically determine real-time betting odds, and facilitate the real-time thereof, as individual bets are occurring for events. Moreover, the present invention may allow for the capturing of audit information involving the individual bets. Yet another possible advantage of the present invention is that accounts among a plurality of wagering facilities may be quickly and systematically settled upon a predetermined schedule. The present invention may also provide increased security and redundant clear channel connections for a nationwide pari-mutuel wagering network. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

Figure 1:
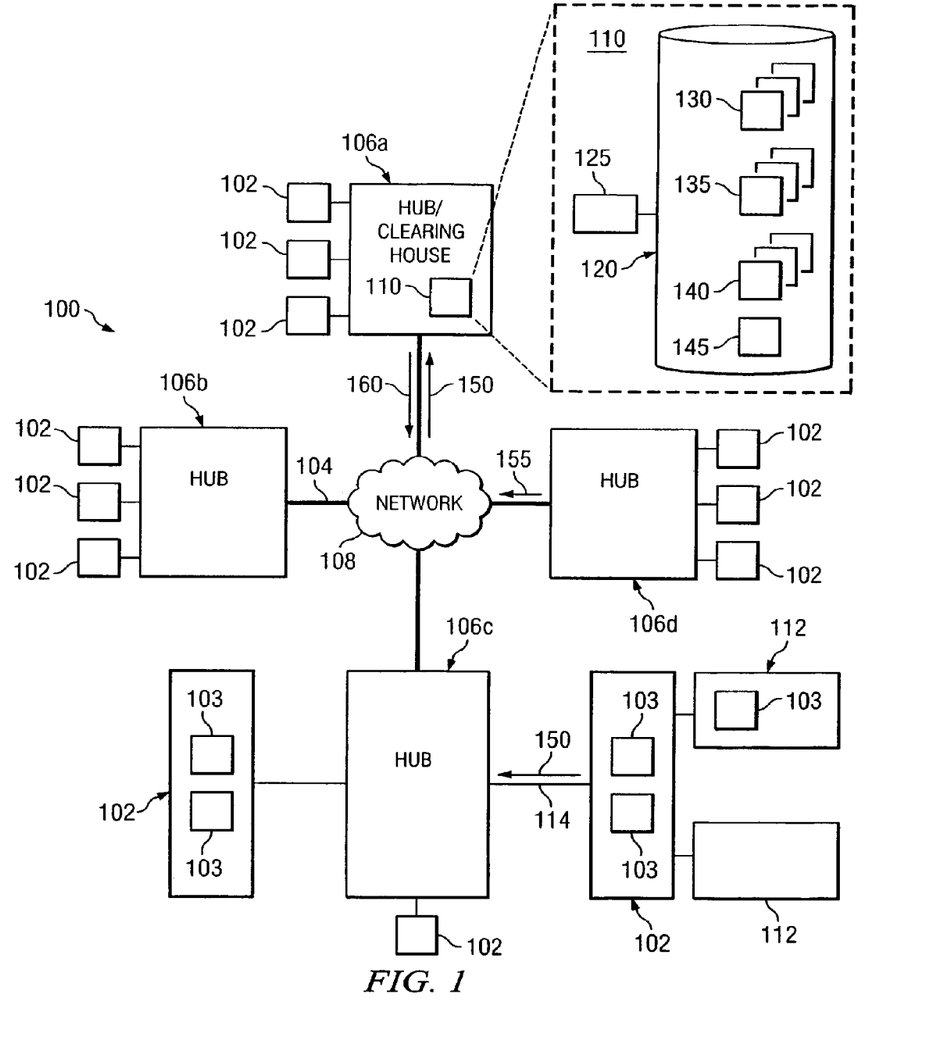
FIG. 1 illustrates an example pari-mutuel wagering system in accordance with one embodiment of the present disclosure.

FIG. 1 is a block diagram illustrating a pari-mutuel system 100 for high-speed communications between wagering facilities 102 or other betting or tote locations. Generally, pari-mutuel system 100 is any system that facilitates high-speed communications between a plurality of wagering facilities 102 to allow for individual bet 150 processing, real-time betting and updates, and automatic settlement processing. More specifically, pari-mutuel system 100 includes a plurality of wagering facilities 102 interconnected through hubs 106 and a network 108. At a high level, pari-mutuel system 100 is a system that allows any number of wagering facilities 102 to electronically participate in betting on a wagering event occurring at another wagering facility 102. For example, pari-mutuel system 100 may be a wagering system providing inter-tote communications. But, pari-mutuel system 100 may be an international, nationwide, regional, or local system without departing from the scope of this disclosure. In short, pari-mutuel system 100 is a high-speed system that allows real-time transmission of wagering information via bets 150 between wagering facilities 102 using hubs 106 and the advanced network 108.

Typically, bets 150 on wagering events occurring at any one of the wagering facilities 102 are communicated across network 108. The events may include horse racing, dog racing, or any other event that may be the subject of pari-mutuel wagering. Accordingly, bets 150 may be any appropriate pari-mutuel wager on the particular event such as, for example, bets for any suitable dollar amount and others. Bets 150 may be initially performed orally, in writing, electronically, or using any other wagering technique so long as a first wagering facility 102 may communicate an electronic form of bet 150 to a second wagering facility 102.

Wagering facility 102 is any location that hosts wagering events and/or allows bettors to wager on wagering events, even those at other facilities 102. For example, wagering facilities 102 may include horse tracks, dog tracks, off-track betting parlors, internet websites, or any other place where a wager may be transmitted to network 108. Typically, the wagering facility 102 that is hosting a particular wagering event determines the betting odds for various participants in the event. Based on these odds, non-hosting wagering facilities 102 (also referred to as simulcast facilities 102) accept bets 150 and, upon receipt, nearly immediately communicate each bet 150 to the host wagering facility 102, thereby affecting the odds in real-time. A simulcast facility 102 may transmit bets 150 to a host facility 102. This allows the host wagering facility 102 to recalculate the odds without delay. These recalculated odds may then be communicated to the betting public at the host facility 102 or at any of the other facilities 102 substantially in real-time. Moreover, this real-time individual transmission of bets 150 allows host wagering facility 102 to ensure that bets 150 are not placed after the event has commenced.

Each wagering facility 102 may include or be associated with a computer, such as one similar to server 110 (described in more detail below) to facilitate the transmission of bets 150 and real-time calculation of odds based on bets 150. Of course, the computer at facility 102 may execute different software or processes or store and process different data (such as odds on wagering events and bets 150) from server 110 without departing from the scope of this disclosure. The present disclosure contemplates computers other than general purpose computers as well as computers without conventional operating systems. As used in this document, the term "computer" is intended to encompass a personal computer, workstation, network computer, or any other suitable processing device. Computer server 110 may be adapted to execute any operating system including UNIX, Windows, Linux, or any other suitable operating system. The computer may be located on-site or remote. Moreover, "computer" and "facility 102" may be used interchangeably as appropriate.

In certain embodiments, wagering facility 102 is communicably coupled with network 108 through one hub 106. Accordingly, each facility 102, or the associated computer, may also include one or more interfaces for communicating with other computer systems, such as other wagering facilities 102, hub 106, other off-track betting locations 112 not directly connected to hub 106, or any other suitable component of pari-mutuel system 100. The interface may comprise logic encoded in software and/or hardware in a suitable combination and operable to communicate with network 108 via connection 114. More specifically, the interface may comprise software supporting one or more communication protocols associated with network 108 and hub 106 or hardware operable to communicate physical signals.

Wagering facility 102 includes one or more betting terminals 103. As used herein, betting terminal 103 is any window, slot, sign-in sheet, card-reader, auctioning terminal, or device operable to receive bets 150 from one or more bettors. As used in this disclosure, betting terminal 103 may further encompass a personal computer, touch screen terminal, workstation, network computer, kiosk, wireless data port, cell phone, personal data assistant (PDA), one or more processors within these or other devices, or any other suitable processing device. For example, betting terminal 103 may comprise a computer that includes an input device, such as a keypad, touch screen, mouse, or other device that can accept information, and an output device that conveys information associated with the operation of system 100, including digital data and visual information. Both the input device and output device may include fixed or removable storage media such as a magnetic computer disk, CD-ROM, or other suitable media to both receive input from and provide output to users of terminals 103 through the display. It will be understood that there may be any number of terminals 103 located in or communicably coupled to each wagering facility 102. Further, "betting terminal 103" and "bettor" may be used interchangeably as appropriate without departing from the scope of this disclosure. But this disclosure contemplates that many bettors may use one terminal 103 to communicate bets 150 on the same wagering event.

Hub 106 is generally any aggregation point or other location that facilitates various simulcast or real-time communications between facilities 102. Hub 106 may comprise a data center, a processing facility, a networking point, an administration office, or any other site operable to provide links between network 108 and at least a subset of facilities 102. For example, system 100 may include a plurality of hubs 106, with each facility 102 being primarily associated with one of the plurality of hubs 106. In one embodiment, hub 106 may be co-located with one of wagering facilities 102. Accordingly, hub 106 may include any number of network devices such as, for example, routers, bridges, hubs, switches, servers, gateway, IP telephones, access control devices, and any other suitable network devices. Moreover, each hub 106 is communicably coupled to network 108 via one or more internodal trunks 104. Internodal trunks 104 may comprise any wireless or wireline link (for example a T-1 line) using any appropriate protocol. Trunks 104 may provide redundancy to help ensure that communications flow quickly and seamlessly. Further, hub 106 may handle tasks such as routing, protocol conversions, security, encryption/decryption, and other suitable functions and may also use any suitable handshakes, logins, and/or other appropriate hardware and/or software protocols so long as hub 106 remains operable to facilitate communication of bets from a first wagering facility 102 to a second wagering facility 102. Therefore, hub 106 provides a high-speed, reliable link between a plurality of wagering facilities 102 and network 108.

Network 108 facilitates wireless or wireline communication between the plurality of wagering facilities 102 and/or hubs 106. Indeed, while illustrated as residing between hubs 106, network 108 may be further located between hub 106 and the one or more associated wagering facilities 102 without departing from the scope of the disclosure. Also, while not illustrated, network 108 may further include hubs 106. In other words, network 108 encompasses any network, networks, or sub-network operable to facilitate communications between wagering facilities 102 and clearinghouse 106. Network 108 may utilize diverse carriers and include perimeters secured with a combination of access lists and IPSec tunnels without departing from the scope of the disclosure. Also, network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Returning to hubs 106, each hub 106 may also be a clearinghouse that automatically monitors and audits all bets 150 being transmitted across network 108 and determines the settlement of accounts between wagering facilities 102. Clearinghouse 106 may capture audit information on bets 150 by monitoring network traffic, receiving copies of bets 150 from the appropriate wagering facility 102, receiving audit information from wagering facilities 102 or hubs 106, or through any other appropriate technique. Clearinghouse 106 may also electronically settle accounts between wagering facilities using results from the relevant wagering events, the captured audit information associated with the events, and contract parameters in place among facilities 102. For example, clearinghouse 106 may include a central server 110 that is operable to store various contract parameters and audit information and automatically determine settlement of accounts between facilities 102 based on this stored information.

Server 110 comprises any local or remote computer operable to audit and process bets 150 and that is communicably coupled to network 108. For example, server 110 may be a general-purpose personal computer (PC), a Macintosh, a workstation, a Unix-based computer, a server computer, or any other suitable device. FIG. 1 provides merely one example of computers that may be used with the disclosure. For example, although FIG. 1 illustrates one server 110 that may be used with the disclosure, pari-mutuel system 100 can be implemented using computers other than servers, as well as a server pool. According to one embodiment, server 110 may be a remote web server. In the illustrated embodiment, server 110 is operable to retrieve and store audit information in memory 120 and generate settlements based on processed bets 150.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes at least auction log 130 (described in more detail in FIG. 2), contract files 135, and account files 140, but may include any other suitable data. At a high level, auction log 130 is any file that stores any appropriate audit information involving bets 150 and the processing thereof.

Contract files 135 comprise logical descriptions (or data structures) of contracts for settling accounts between at least two wagering facilities 102. More specifically, contract files 135 includes contract parameters and identifiers of wagering facilities 102. Contract parameters may comprise any logic, rules, algorithms, or data operable to be processed by system 100 to determine the appropriate settlement between the respective facilities 102. For example, one contract parameter may comprise a simulcast fee charged by a first wagering facility 102 hosting the wagering event to a second wagering facility 102. Contract files 135 may be arranged in any suitable format and stored in any physical or logical data storage operable to be defined, processed, or retrieved by externally implemented code. Contract files 135 may also comprise one or a plurality of tables or files stored on one server 110 or across a plurality of servers 110. Moreover, contract files 135 may be stored as local or remote files without departing from the scope of this disclosure.

Account files 140 comprises logical descriptions (or data structures) of accounts for wagering facilities 102. For example, each wagering facility 102 may be associated with one or more accounts represented in account files 140. Account files 140 may be arranged in any suitable format and stored in any physical or logical data storage operable to be defined, processed, or retrieved by externally implemented code. Account files 140 may also comprise a plurality of tables or files stored on one server 110 or across a plurality of servers 110. Moreover, account files 140 may be local or remote without departing from the scope of this disclosure.

Server 110 also includes processor 125. Processor 125 executes instructions and manipulates data to perform the operations of server 110 such as, for example, a central processing unit (CPU). Although FIG. 1 illustrates a single processor 125 in server 110, multiple processors 125 may be used according to particular needs, and any reference to processor 125 is meant to include multiple processors 125 where applicable. In certain embodiments, processor 125 executes settlement engine 145 implementing any suitable process using any appropriate logic, rules, or algorithms. Settlement engine 145 could include any software, firmware, or combination thereof operable to audit bets 150 and at least partially settle accounts between wagering facilities 102. Settlement engine 145 may be further operable to encrypt or decrypt communications such as, for example, bets 150 or audit information.

In one aspect of operation, a first wagering facility 102 hosts a wagering event, such as a horse race, dog race, and jai alai. First facility 102 automatically computes the odds for the participants in the event and communicates these odds to at least a subset of non-host wagering facilities 102. The term "automatically," as used herein, generally means that the appropriate processing is substantially performed by at least part of pari-mutuel system 100. It should be understood that "automatically" further contemplates any suitable user or bettor interaction with pari-mutuel system 100 without departing from the scope of this disclosure. A second one of the wagering facilities 102 receives a bet 150 on the wagering event from a bettor, often at betting terminal 103. Second wagering facility 102 transmits electronic bet 150 to first wagering facility 102 through hub 106 and network 108. As described above, this transmission may occur substantially in real-time and on a bet-by-bet basis. During transmission, clearinghouse 106 captures audit information on bet 150 and stores the captured information in audit log 130.

For example, a bettor places a $100.00 bet 150 on a particular horse race hosted by the first wagering facility 102. In this example, bet 150 is placed at a simulcast facility 102 such as a second wagering facility 102. This $100.00 bet 150 is transmitted in real-time to the first wagering facility 102. Clearinghouse 106 captures audit information from network 108 such that audit log 130 may include a transaction identifier, an identifier of the first wagering facility, an identifier of the second wagering facility, a terminal ID, an identifier of the wagering event, the bet (e.g., a win bet on horse #3), an amount of the bet, a timestamp, a bettor ID (when available), and a hub. Further, at any appropriate time, clearinghouse 106 deducts a take-out or commission associated with the second facility 102 (e.g., 15%) from the bet amount, resulting in $85.00. In this case, the deducted $15.00 belongs to second wagering facility 102 for initiating bet 150.

Once first wagering facility 102 receives bet 150, first facility 102 recalculates the odds on the particular event specified by bet 150. According to certain embodiments, first facility 102 identifies at least a subset of one or more stored bets 150 that are associated with the particular event. First wagering facility 102 then recalculates the odds in substantially real-time based on the identified subset of stored bets 150 and received bet 150. In certain embodiments, if a second bet 150 is received within a predetermined period of time after first bet 150 is received (e.g., between 0 and 15 seconds), then first wagering facility may recalculate based on first and second bets 150. Once recalculated, first facility 102 automatically transmits the odds to at least the second wagering facility 102 via network 108. First facility 102 may also present the recalculated odds to the betting public at host facility 102. In one embodiment, wagering facility 102 recalculates the odds dynamically and in real-time upon receiving bet 150. In other embodiments, facility 102 recalculates the odds at particular intervals of time, but generally no later than the commencement of the particular event such as the horse race.

This near-immediate receipt of bets 150 from any non-host facilities 102 and recalculation and transmission of odds based on individual bets 150 may continue until first wagering facility 102 determines that betting should stop. In one embodiment, first facility 102 may itself refuse bets 150 already communicated from other facilities 102 such as, for example, through an internal "stop bet" command 155. For example, upon commencement of the event or a predetermined period of time prior to the commencement of the event, host facility 102 may generate a "stop bet" command 155 signifying that no subsequent bets 150 will be accepted. If host facility 102 then receives bets 150, such as from other wagering facilities 102 via network 108, then host wagering facility denies bet 150.

In another embodiment, first facility 102 may generate and communicate a "stop bet" command 155 to network 108 based on the commencement of the particular event. The "stop bet" command 155 generally tells network 108 to refuse any future bets 150 from any of the non-host wagering facilities. In yet another embodiment, first facility 102 may communicate the "stop bet" command 155 to second non-hosting facilities 102. Occasionally, second wagering facility 102 may transmit a received bet 150 prior to receiving the "stop bet" command 155. In this case, first wagering facility 102 may first determine or verify that bet 150 was actually communicated prior to issuance of the "stop bet" command 155. If so, then first wagering facility 102 may accept bet 150 and perform the recalculation of the odds for the event. If first facility 102 determines that bet 150 was not received prior to issuance of the "stop bet" command 155, then first wagering facility 102 may refuse bet 150. Once the event is completed, first wagering facility 102 transmits the results to clearinghouse 106 and appropriate non-host wagering facilities 102.

At any predetermined time (such as once a week), clearinghouse 106 processes the results of one or more events to settle the accounts of the various facilities 102 involved in the events or betting thereon. In one embodiment, processor 125 may select a first subset of bets from audit log 130 based on the first (or host) wagering facility 102 and a second one of the non-host wagering facilities 102. Next, processor 125 identifies the appropriate contract parameters from contract files 135 based on the two facilities 102. Using these parameters, processor 125 generates a settlement, or a calculated transfer of funds, between first and second facility 102. Next, processor 125 may debit or credit the accounts of each facility 102 in account files 140 using Electronic Funds Transfer (EFT) techniques. When appropriate, clearinghouse 106 may communicate the settlement, now reflected in account files 140, to one or more banks to initiate the transfer of funds. Clearinghouse 106 may continue this processing until the accounts between the first wagering facility 102 and each non-host facility 102, which transmitted bets 150, are settled. Clearinghouse 106 may communicate the results of these settlements to the appropriate wagering facilities 102.

Returning to the example $100.00 bet on the particular horse, first wagering facility 102 may transmit a message to clearinghouse 106 to the effect that bet 150 lost. Clearinghouse 106 collects i) the appropriate contract parameters from contracts files 135 between first and second wagering facility 102; and ii) the audit information associated with exemplary bet 150. Based on the contract parameters, clearinghouse 106 may determine that there is a simulcast fee of 3%, or $3.00 of the example bet amount ($100.00), due to first wagering facility 102. Accordingly, clearinghouse 106 calculates that second wagering facility 102 owes first wagering facility 102 $88.00, or $100.00 (original bet)−15.00 (take-out)+3.00 (simulcast fee), leaving $12.00 of the bet amount in the account of second wagering facility 102. Clearinghouse 106 then updates the account of each facility 102 in account files 140 and/or facilitates an EFT between the facilities 102 based on the determined settlement.

In the alternative, first wagering facility 102 may transmit a message to clearinghouse 106 to the effect that bet 150 won. Clearinghouse 106 collects i) the appropriate contract parameters from contracts files 135 between first and second wagering facility 102; and ii) the audit information associated with exemplary bet 150. Based on the contract parameters, clearinghouse 106 may determine that there is a simulcast fee of 3%, or $3.00 of the example bet amount, due to first wagering facility 102. Accordingly, clearinghouse 106 calculates that second wagering facility 102 owes first wagering facility 102 $88.00, or $100.00 (original bet)−15.00 (take-out)+3.00 (simulcast fee). But, since bet 150 won, clearinghouse 106 further determines that first wagering facility 102 owes the winning amount (e.g. $400.00 on 3-1 odds) to second wagering facility 102. Accordingly, clearinghouse 106 determines that first wagering facility 102 owes second wagering facility 102 $312.00 ($400.00−88.00). Clearinghouse 106 then updates the account of each facility 102 in account files 140 and/or facilitates an EFT between the facilities 102 based on the determined settlement.

Figure 2:
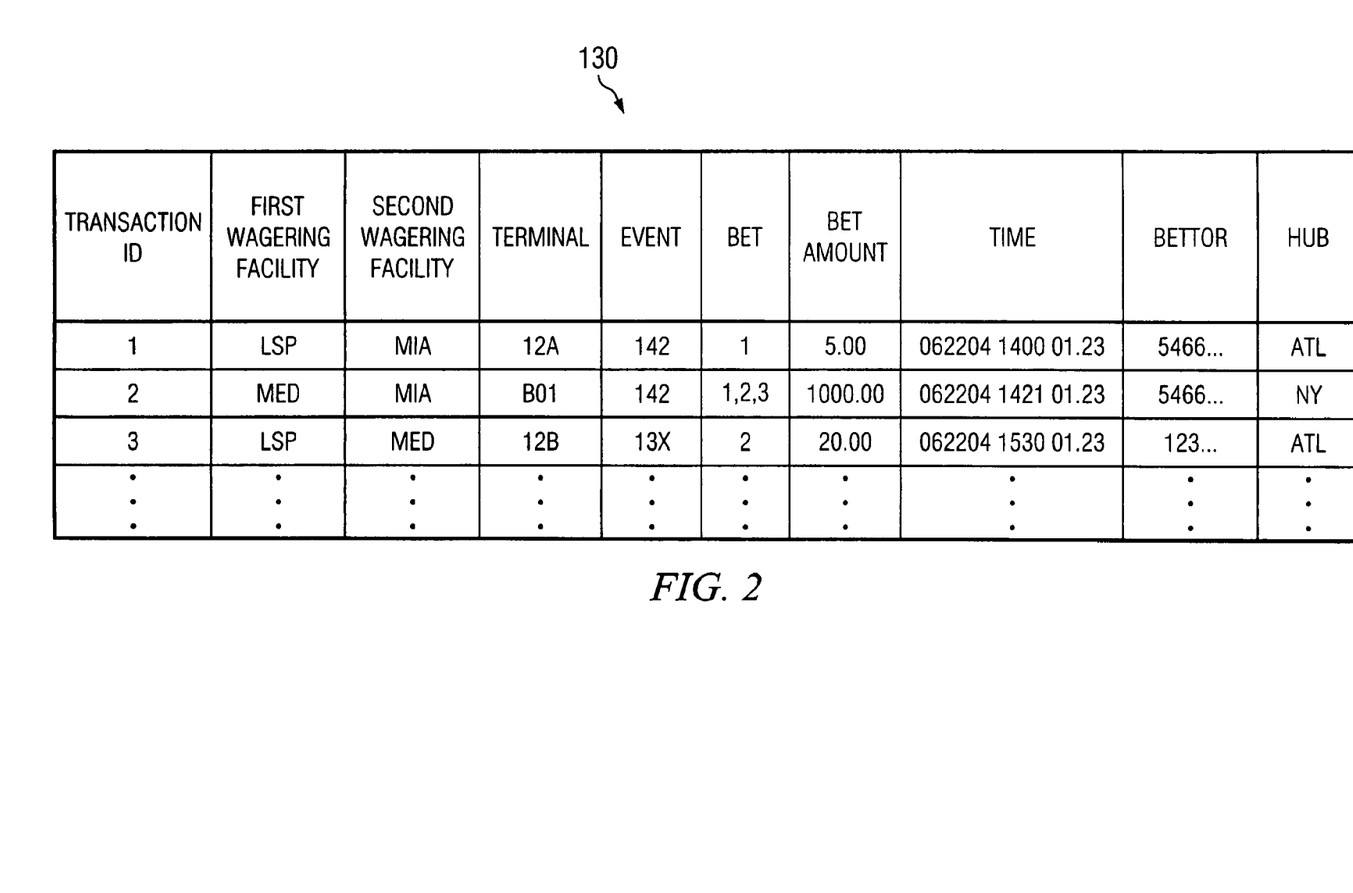
FIG. 2 is an example view of an audit log stored by a clearinghouse in the pari-mutuel system of FIG. 1.

FIG. 2 illustrates one example of audit log 130 in accordance with one embodiment of system 100. In general, system 100 uses audit log 130 to securely store and process audit information of bets 150 traversing system 100. This audit information may allow system 100 to ensure security and accuracy of bets 150, quickly respond to requests from agencies, locate and correct system issues, or other appropriate processes. In the illustrated embodiment, audit log 130 is a multi-dimensional data structure that includes at least one audit record. But audit log 130 may be arranged in any appropriate format. In this example, each audit record includes data, pointers, references, or any other identifier of a transaction, first wagering facility 102, second wagering facility 102, a terminal 103, the wagering event, the bet (e.g., a win on horses #2), an amount of the bet, a timestamp, a bettor (when available), and a hub 106. It will be understood that each audit record may include none, some, or all of the example data. In one embodiment, each audit record may include links, foreign keys, or pointers to another table. The audit records illustrated in audit log 130 are merely exemplary and system 100 contemplates any other suitable audit component to allow for suitable auditing of bets 150. Moreover, audit log 130 may be separated into multiple tables or files without departing from the scope of the invention.

Figure 3:
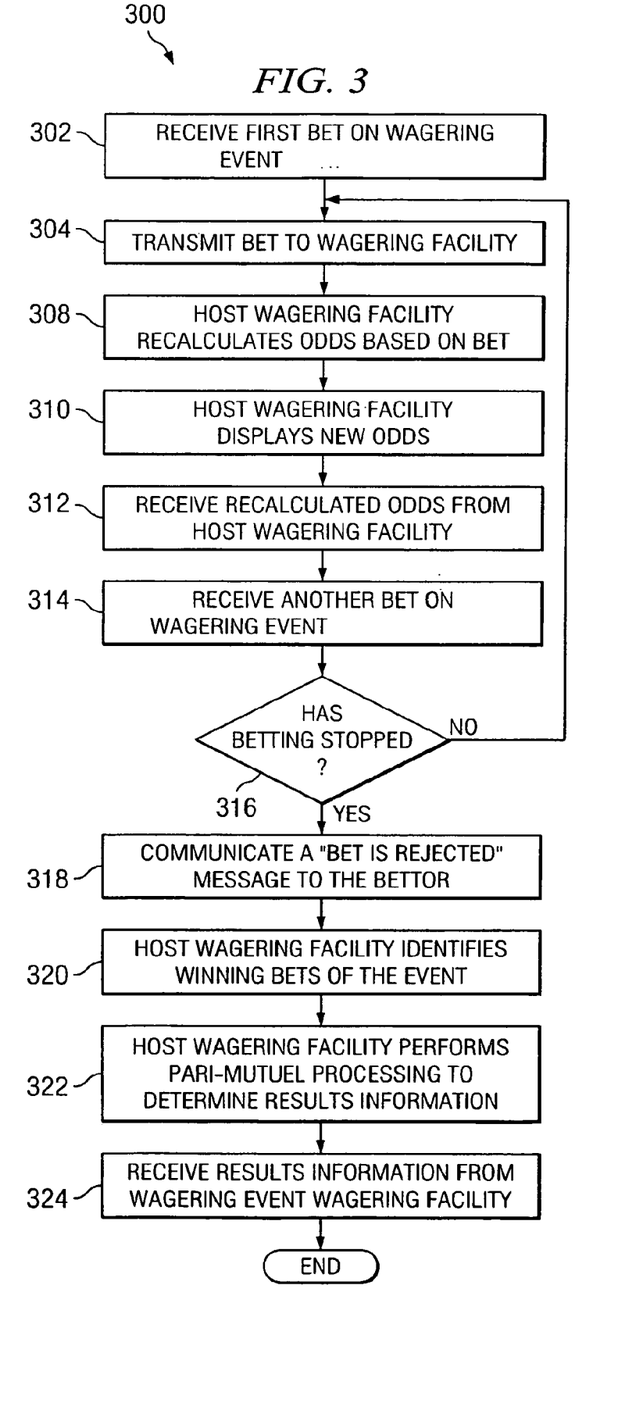
FIG. 3 illustrates an exemplary method for communicating bets between wagering facilities via the pari-mutuel system in accordance with one embodiment of the present invention.
Figure 4:
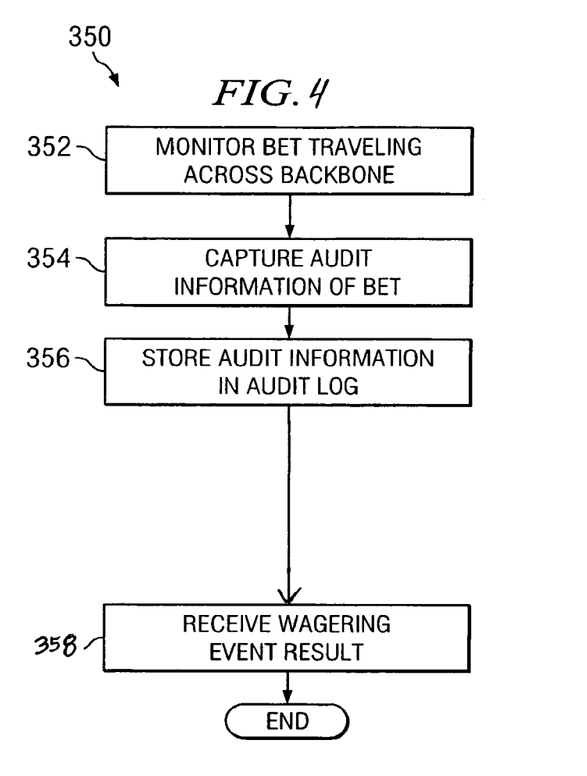
FIG. 4 illustrates an exemplary method for monitoring bets between wagering facilities with access to the pari-mutuel system in accordance with one embodiment of the present invention.

FIGS. 3 and 4 are flowcharts illustrating example methods 300 and 350, respectively, for various aspects of electronic, real-time processing of pari-mutuel wagering. First, FIG. 3 illustrates method 300, which generally describes the communication and processing of bets between facilities 102 via the high-speed pari-mutuel network 108 in accordance with one embodiment of the present invention. Second, FIG. 4 illustrates method 350, which generally describes the monitoring of bets between facilities 102 with access to pari-mutuel system 100 in accordance with one embodiment of the present invention. The following descriptions focus on the operation of particular components of pari-mutuel system 100 in performing methods 300 and 350. But pari-mutuel system 100 contemplates using any appropriate combination and arrangement of logical elements to implement some or all of the described functionality and techniques.

At a high level, method 300 includes the receiving and transmission of individual bets 150, on an event hosted by first wagering facility 102, in real-time and the real-time recalculation of odds based on each bet 150. Method 300 begins at step 302, where second wagering facility 102 receives a first bet 150 on the event hosted by first wagering facility 102. As described above, first bet 150 may be manually received at a betting window, electronically received from a betting terminal 103, or received using any other appropriate technique. After any appropriate processing, second wagering facility 102 transmits bet 150 to first wagering facility 102 through the appropriate hub 106 in network 108. First wagering facility 102 then dynamically recalculates the odds based on the received bet 150 and any other bets 150 in memory at step 308. Next, at step 310, second wagering facility 102 displays the new odds to current attendees or bettors on the event. First wagering facility 102 then transmits, often in real-time, the recalculated odds to one or more wagering facilities 102, which are not hosting the event, via network 108.

At step 312, second wagering facility 102 receives the recalculated odds from first facility 102. Next, second wagering facility 102 receives another bet 150 on the event at step 314. At decisional step 316, second wagering facility 102 determines if first wagering facility 102 has stopped accepting bets 150 for the particular event. One way first facility 102 may indicate this is by issuing an internal "stop bet" command 155 and issuing "bet is rejected" message to facilities 102 transmitting subsequent bids 150. The "stop bet" command 155 may also have been communicated to network 108, one or more hubs 106, and/or one or more wagering facilities 102. In other words, second wagering facility 102 may receive an error message from first wagering facility 102 based on an attempted transmission of bet 150, may determine if the "stop bet" command 155 was communicated by querying hub 106, or through any other suitable technique. If betting was not stopped by first wagering facility 102, then processing returns to step 304. Otherwise, second wagering facility 102 communicates the "bet is rejected" message to the respective bettor and refuses bet 150. This "bet is rejected" message may be verbal, electronic, or in any other appropriate format.

Once the wagering event is over, first wagering facility 102 identifies the winner of the wagering event at step 320. Then, based upon the results of the event, first wagering facility 102 performs pari-mutuel processing to determine results information at step 322. In one embodiment, the pari-mutuel processing may include aggregating all bets 150 involving the particular event and determining the distribution of at least a portion of bets 150 among the winning bettors. Of course, any pari-mutuel processing may be used. At step 324, second wagering facility 102 receives the determined results information from first wagering facility 102 via network 108. Second wagering facility 102 may distribute the expected winnings to the winning bettors and have accounts automatically settled by clearinghouse 106, as described in more detail in FIG. 5.

Generally, method 350 includes clearinghouse 106 capturing audit information on bets 150 traversing network 108. Method 350 begins at step 352, where clearinghouse 106 monitors bets 150 transmitted between first and second facilities 102 across network 108. At step 354, clearinghouse 106 captures audit information of bet 150 using any suitable technique. For example, clearinghouse 106 may capture the desired information by parsing and scanning the electronic bet 150, receiving a copy of bet 150 from facility 102, or through any other technique. Once captured, clearinghouse 106 stores the audit information in audit log 130 at step 356. At any appropriate time, clearinghouse 106 receives results for the particular event, which occurred at first wagering facility 102, at step 358. Further, although method 350 is illustrated as continuing on to step 358, it should be understood that clearinghouse 106 may continue to monitor network 108 by performing steps 352-356 in parallel with step 358.

Figure 5:
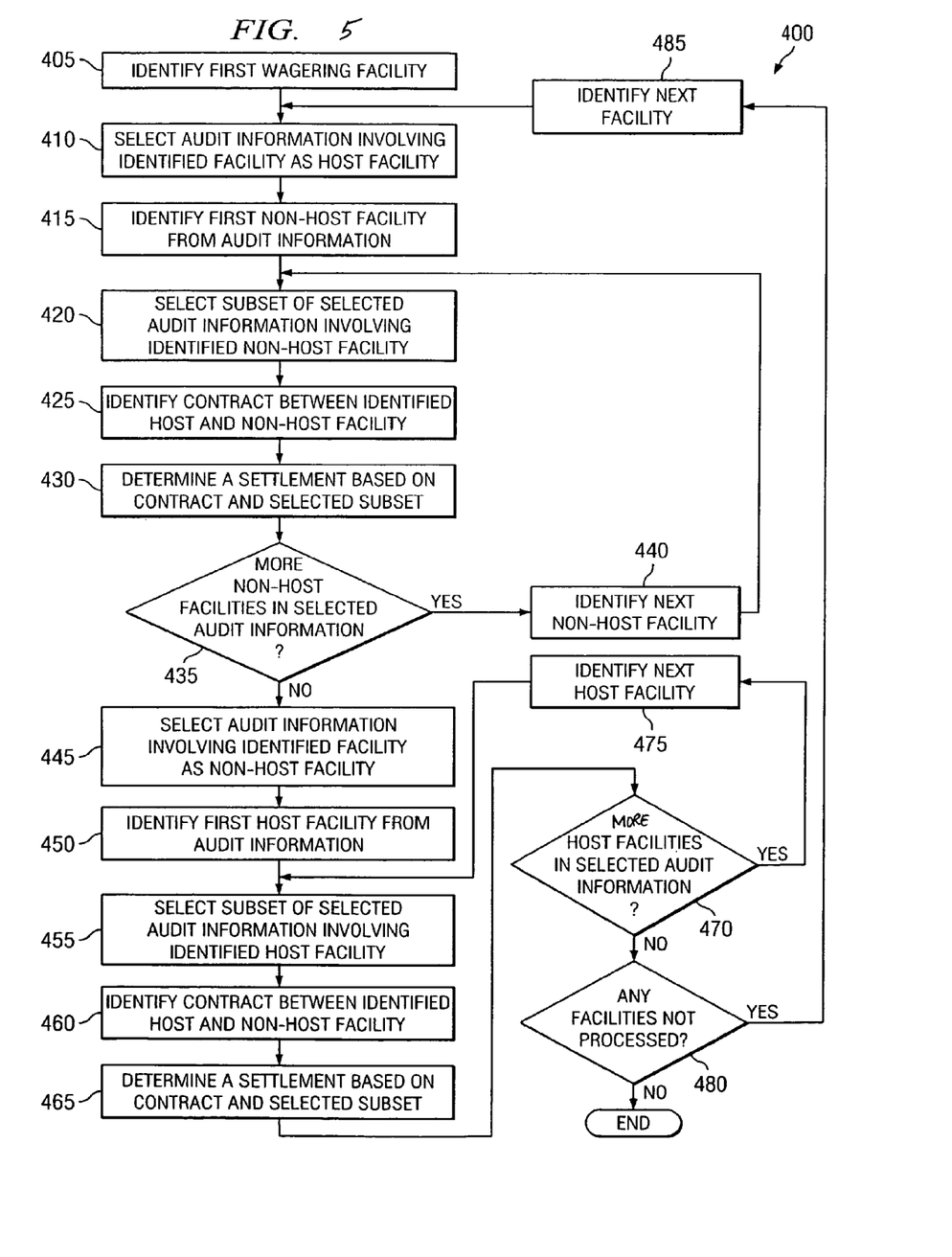
FIG. 5 illustrates an exemplary method for determining settlements between wagering facilities with access to the pari-mutuel system in accordance with one embodiment of the present invention.

FIG. 5 illustrates an example method 400 for determining settlements between wagering facilities 102 with access to the network 108 in accordance with one embodiment of the present invention. Generally, clearinghouse 106 processes all unprocessed bets 150 using the captured audit information to systematically settle accounts between appropriate facilities 102.

Method 400 begins at step 405, where clearinghouse 106 identifies a first wagering facility 102. Clearinghouse 106 then selects audit information, captured from the monitored bets 150, involving the identified wagering facility 102 as the host facility 102 at step 410. Next, at step 415, clearinghouse 106 identifies a first non-host facility 102 based on the selected audit information. Clearinghouse 106 then selects a subset of the audit information involving the identified non-host facility 102 at step 420. Next, clearinghouse 106 identifies an electronic contract, from contract files 135, between the identified host and non-host wagering facilities 102 at step 425. For example, server 110 may select the appropriate contract parameters, such as the simulcast fee, from contract files 135 that are stored in memory 120. Clearinghouse 106 then processes the selected subset of audit information based on the identified contract parameters and results to produce a settlement of accounts between the two facilities 102 at step 430. At decisional step 435, clearinghouse 106 determines if there are unprocessed non-host facilities 102 remaining in the audit information selected at step 410. If there are, then clearinghouse 106 identifies the next non-host facility 102 at step 440 and processing returns to step 420.

If all the particular non-host facilities 102 have been processed for the selected audit information, then at step 445, clearinghouse 106 selects alternative audited information, captured from the monitored bets 150, involving the wagering facility 102 (identified in step 405) as the non-host facility 102. Next, at step 450, clearinghouse 106 identifies a first host facility 102 based on the selected audit information. Clearinghouse 106 then selects a subset of the audit information involving the identified host facility 102 at step 455. Next, clearinghouse 106 identifies an electronic contract, from contract files 135, between the identified host and non-host wagering facilities 102 at step 460. Clearinghouse 106 then processes the selected subset of audit information based on the identified contract parameters and results to produce a settlement of accounts between the two facilities 102 at step 465. At decisional step 470, clearinghouse 106 determines if there are unprocessed host facilities 102 remaining in the audit information selected at step 445. If there are, then clearinghouse 106 identifies the next non-host facility 102 at step 475 and processing returns to step 455. Otherwise, at decisional step 480, clearinghouse 106 determines if there are unprocessed facilities 102. If there are, clearinghouse 106 identifies the next facility 102 at step 485 and processing returns to step 410.

Otherwise, clearinghouse 106 determines that accounts have been settled between the plurality of facilities 102 of system 100 and processing ends. It should be understood that clearinghouse 106 may use intelligence to ensure that facilities are not inefficiently processed or may aggregate settlements determined at steps 430 and 465 to generate a single settlement between the respective facilities 102. In certain embodiments, clearinghouse 106 may facilitate a funds transfer between the facilities 102 through an EFT process for banks at any appropriate time. Also, clearinghouse 106 may communicate settlement 160 to the respective non-host facility 102 and the host wagering facility 102.

The preceding flowcharts and accompanying description illustrate only exemplary methods 300, 350, and 400. Pari-mutuel system 100 contemplates using any suitable technique for performing these and other tasks. Accordingly, many of the steps in these flowcharts may take place simultaneously and/or in different orders than as shown. Moreover, pari-mutuel system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A server comprising at least one processor, a database, a tangible memory device storing instructions, and a hardware based communications interface operable to communicate with a network that communicatively couples a first wagering facility and a second wagering facility, wherein the instructions, when executed by the at least one processor, direct the at least one processor to:

store within the database contract parameters that provide a description of a contract for settling accounts between the first wagering facility and the second wagering facility, wherein the parameters comprise a simulcast fee charged by the second wagering facility for hosting a wagering event to the first wagering facility, the first wagering facility comprising at least one of a facility that hosts wagering events and a simulcast facility operable to simulcast the wagering event hosted by the second wagering facility;

store within the database account parameters that provide a description of an account of the first wagering facility and an account of the second wagering facility;

as the first wagering facility transmits over the network to the second wagering facility a bet placed at the first wagering facility on the wagering event hosted by the second wagering facility, monitor the network via the communications interface to receive a copy of the transmitted bet, wherein the copy of the transmitted bet is encrypted;

decrypt the copy of the transmitted bet;

based on the decrypted transmitted bet, store within the database information on the transmitted bet, wherein the information on the transmitted bet comprises an identifier of the first wagering facility, an identifier of the second wagering facility, an identifier of the wagering event, and an amount of the bet;

receive via the communications interface from the network a result of the wagering event, wherein the result is transmitted by the second wagering facility onto the network;

using the identifier of the first wagering facility and the identifier of the second wagering facility, retrieve from the database the information on the transmitted bet and the contract parameters;

determine a settlement between the first and second wagering facilities based at least in part upon the result of the wagering event, the retrieved bet information, and the contract parameters;

retrieve from the database the account parameters that provide the description of the account of the first wagering facility and the account of the second wagering facility; and based at least in part upon the settlement determination, initiate a transaction to transfer funds between the account of the first wagering facility and the account of the second wagering facility.

2. The server of claim 1, wherein the information on the transmitted bet further comprises:
   a transaction identifier; and
   a time stamp.

3. The server of claim 1, wherein the wagering event comprises a horse race, the second wagering facility comprises a horse track, and the first wagering facility comprises one of a horse track and an off-track betting parlor.

4. The server of claim 1, wherein to determine the settlement comprises to determine the settlement based on the simulcast fee charged by the second wagering facility to the first wagering facility for hosting the wagering event to the first wagering facility.

5. A method performed by a server that comprises at least one processor, a database, and a hardware based communications interface that communicates with a network that that communicatively couples a first wagering facility and a second wagering facility, the method comprising:
   storing within the database contract parameters that provide a description of a contract for settling accounts between the first wagering facility and the second wagering facility, wherein the parameters comprise a simulcast fee charged by the second wagering facility for hosting a wagering event to the first wagering facility, the first wagering facility comprising at least one of a facility that hosts wagering events and a simulcast facility operable to simulcast the wagering event hosted by the second wagering facility;
   storing within the database account parameters that provide a description of an account of the first wagering facility and an account of the second wagering facility;
   as the first wagering facility transmits over the network to the second wagering facility a bet placed at the first wagering facility on the wagering event hosted by the second wagering facility, monitoring the network via the communications interface to receive a copy of the transmitted bet, wherein the copy of the transmitted bet is encrypted;
   decrypting the copy of the transmitted bet;
   based on the decrypted transmitted bet, storing within the database information on the transmitted bet, wherein the information on the transmitted bet comprises an identifier of the first wagering facility, an identifier of the second wagering facility, an identifier of the wagering event, and an amount of the bet;
   receiving via the communications interface from the network a result of the wagering event, wherein the result is transmitted by the second wagering facility onto the network;
   using the identifier of the first wagering facility and the identifier of the second wagering facility, retrieving from the database the information on the transmitted bet and the contract parameters;
   determining a settlement between the first and second wagering facilities based at least in part upon the result of the wagering event, the retrieved bet information, and the contract parameters;
   retrieving from the database the account parameters that provide the description of the account of the first wagering facility and the account of the second wagering facility; and
   based at least in part upon the settlement determination, initiating a transaction to transfer funds between the account of the first wagering facility and the account of the second wagering facility.

6. The method of claim 5, wherein the information on the transmitted bet further comprises of:
   a transaction identifier; and
   a time stamp.

7. The method of claim 5, wherein the wagering event comprises a horse race, the second wagering facility comprises a horse track, and the first wagering facility comprises one of a horse track and an off-track betting parlor.

8. The method of claim 5, wherein determining the settlement comprises determining the settlement based on the simulcast fee charged by the second wagering facility to the first wagering facility for hosting the wagering event to the first wagering facility.

9. An apparatus associated with an electronic device of a first wagering facility to communicate electronic wagering over a communication network to communicate with an electronic device of a second wagering facility, the apparatus comprising:
   at least one processing device; and
   a non-transitory medium having stored thereon software that when executed by the processing device makes the apparatus:
   receive from a bettor a bet on at least one wagering event, wherein the bet is made through an electronic device of the first wagering facility;
   transmit over the communication network the bet to an electronic device of the second wagering facility;
   receive a stop bet command from the electronic device of the second wagering facility;
   receive from electronic device of the second wagering facility an indication that the second wagering facility accepted the bet, based at least in part on the second wagering facility determining that the bet was transmitted by electronic device of the first wagering facility prior to the generation of the stop bet command; and
   convey to the bettor that the bet has been accepted.

10. An apparatus associated with a first wagering facility comprising at least one processing device having software associated therewith that when executed by the processing device makes the processing device operable to:
   receive a first bet on at least one wagering event;
   receive a second bet of the at least one wagering event;
   transmit the first bet and the second bet to a second wagering facility, wherein each of the first bet and the second bet comprise a timestamp, wherein the second wagering facility hosts the at least one wagering event, wherein the first wagering facility allows a plurality of bettors to submit bets at least on the at least one wagering event, and wherein the processing device is operable to communicate the submitted bets on the at least one wagering event to the second wagering facility;
   receive a stop bet command from the second wagering facility, wherein the stop bet command is an indication that no bets on the at least one wagering event will be accepted;
   receive from the second wagering facility an indication that the second wagering facility accepted the first bet based at least in part on the second wagering facility determining that the first bet was transmitted by the first wagering facility prior to the generation of the stop bet command; and
   receive from the second wagering facility an indication that the second wagering facility denied the second bet based at least in part on the second wagering facility determining that the second bet was transmitted by the first wagering facility subsequently to the generation of the stop bet command.

11. An apparatus to communicate electronic wagering over a communication network with an electronic device, the apparatus comprising:

at least one processing device; and at least one non-transitory medium having stored thereon a plurality of instructions that when executed by the at least one processing device cause the apparatus:

receive over a communication network from an electronic device a first bet on a wagering event;

after receiving the first bet, receive over the communication network from an electronic device a second bet on the wagering event;

determine that the second bet is received during a predetermined period of time after the first bet is received;

based at least in part on determining that the second bet is received during the predetermined period of time, recalculate betting odds for the wagering event based at least in part on the first bet and the second bet; and cause the recalculated betting odds to be conveyed to at least one bettor.

12. An apparatus associated with a first wagering facility to communicate electronic wagering over a communication network with a second wagering facility, the apparatus comprising:

at least one processing device; and at least one non-transitory medium having stored thereon a plurality of instructions that when executed by the at least one processing device cause the apparatus to:

receive at least one bet on a wagering event;

after receiving the at least one bet, determine that no subsequent bets on the wagering event will be accepted;

after determining that no subsequent bets on the wagering event will be accepted, receive from a computing device another bet on the wagering event;

determine that the computing device transmitted the another bet prior to the processing device determining that no subsequent bets on the wagering event will be accepted; and based at least in part on determining that the computing device transmitted the another bet prior to the processing device determining that no subsequent bets on the wagering event will be accepted, accept the another bet.

13. An apparatus associated with a first wagering facility that hosts a wagering event, the apparatus comprising at least one processing device having software associated therewith that when executed by the processing device directs the processing device to:

receive at least one bet on the wagering event;

after receiving the at least one bet, determine that no subsequent bets on the wagering event will be accepted;

transmit to a computing device an indication that no subsequent bets on the wagering event will be accepted, wherein the computing device is associated with a second wagering facility that allows a plurality of bettors to submit bets at least on the wagering event;

after determining that no subsequent bets on the wagering event will be accepted, receive from the computing device another bet on the wagering event;

determine that the computing device transmitted the another bet prior to the processing device transmitting the indication that no subsequent bets on the wagering event will be accepted;

based at least in part on determining that the computing device transmitted the another bet prior to the processing device transmitting the indication that no subsequent bets on the wagering event will be accepted, accept the another bet;

based at least in part on accepting the another bet, calculate betting odds for the wagering event based at least in part on the another bet; and transmit the calculated betting odds to the computing device.

* * * * *